Oct. 3, 1961     K. F. SCHLICHTING     3,002,605
APPARATUS FOR TRANSPORTING AND GUIDING FISH TO
THE TOOLS OF FISH DRESSING MACHINES
Filed July 9, 1957
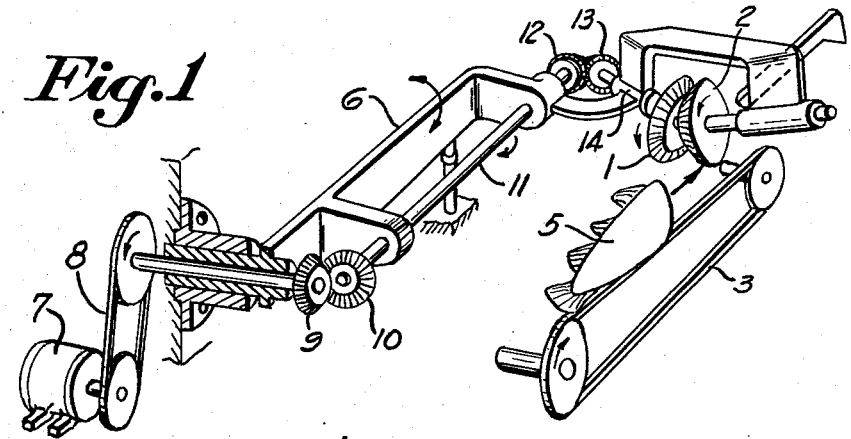
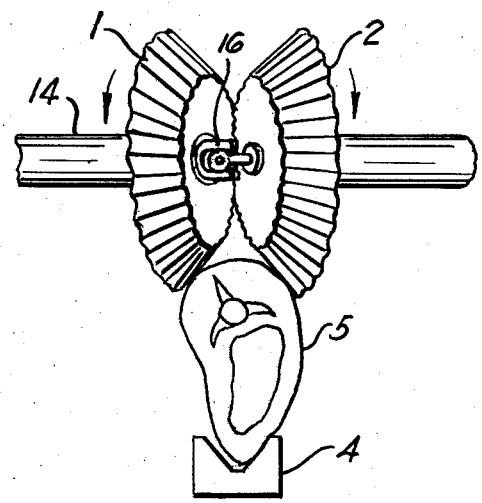
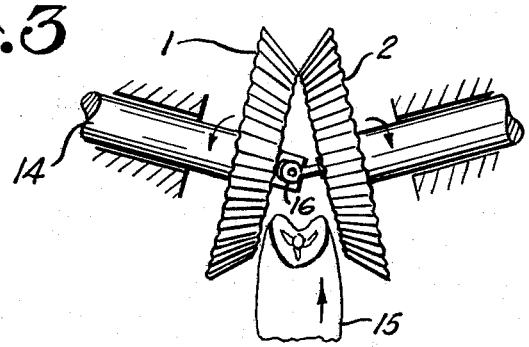
INVENTOR.
K. F. SCHLICHTING
BY
Richards & Geier
ATTORNEYS United States Patent Office 3,002,605
Patented Oct. 3, 1961

3,002,605
APPARATUS FOR TRANSPORTING AND GUIDING FISH TO THE TOOLS OF FISH DRESSING MACHINES
Karl Friedrich Schlichting, Lubeck, Germany, assignor to Nordischer Maschinenbau Rud. Baader, Lubeck, Germany, a firm
Filed July 9, 1957, Ser. No. 670,784
Claims priority, application Germany, July 17, 1956
1 Claim. (Cl. 198—167)

The invention relates to a method for transporting and guiding fish to the tools of a fish dressing machine and consists in that the fish, transported on their belly and back are additionally subjected to guiding and straightening forces which are directed at an angle to the body of the fish and exert a twisting or torsional movement on the body of the fish.

The transport of the fish and the accurately centered feed to the tools of a fish dressing machine is today designed to a great extent so that there is no difficulty in the case of normal fish. As, however, the fish, between the time they are caught and dressed, become bent and/or distorted so that they are of unsymmetrical cross-section, due to freezing, pressing into packing containers and other mechanical operations, the "inactive" guides hitherto employed, which merely exert a pushing effect on the fish without changing the shape thereof, are not sufficient to bring a distorted or deformed fish back into its normal shape, especially as a fish, once deformed, offers considerable resistance. This is due primarily to the fact that the fish does not lose the shape caused by freezing and rigidity of death, even after the rigidity is relaxed and freezing ceases. If, however, deformed fish are fed to the processing tools, it is evident that the tools are no longer capable of carrying out their work in a satisfactory manner.

It has now been found that these objections can be overcome in a simple manner if the guiding and transporting means which hitherto were only "inactive" in their operation, that is only transport and guide the fish in its actual state, are now rendered "active" in their operation, that is act forcibly on the fish in such a manner that the fish is forced back into its normal shape. This is effected according to the invention by allowing the transporting and guiding means to exert additional straightening forces directed at an angle to the symmetry plane of the fish and producing a twisting or torsional effect on the body of the fish. By this means the fish, bent in longitudinal direction, is again straightened and any unsymmetrical distortion or deformation of cross-section is corrected by the twisting effect.

An apparatus which has proved particularly advantageous and effective for carrying out the method according to the invention, consists in the use of two rotary frusto conical rollers, the axes of which are set at an angle to each other so that the frusto conical rollers are closer together in the direction in which the fish travels. When the fish is bent in longitudinal direction, the frusto conical surfaces press the body of the fish back so that it is stretched along its longitudinal axis, and in so doing the gradually narrowing frusto conical rollers ensure that the bending back of the fish into its stretched state is effected gradually. When the cross-sectional shape of the fish is deformed, the forces exerted by the conical surfaces set at an angle to the central plane of the fish act as a rotary straightening force which brings the cross-sections of the fish back into symmetrical shape, this being done gradually owing to the conical surfaces coming closer together.

An apparatus for carrying out the method according to the invention is illustrated by way of example in the accompanying drawing, in which:

FIG. 1 is a perspective view of the whole apparatus some parts being shown in section;

FIG. 2 shows the "active" guiding mechanism in elevation, and

FIG. 3 is a top plan view of FIG. 2.

As can be seen from FIG. 1, the transporting guide consists of a lower transport band 3 and two frusto conical rollers 1 and 2 arranged thereover and constituting an upper transporting guide. The transport band 3, to attain its guiding effect, is set with trough-shaped carrier members 4 which guide the belly of the fish in a perfect manner. The drive for the frusto conical rollers 1 and 2, which is shown in FIG. 1, includes a motor 7 driving by means of a belt drive 8 two meshing gears 9 and 10. The shaft 11 carrying the bevel gear 10, is mounted upon an arm 6 and also carries a bevel gear 12 meshing with the bevel gear 13 which is carried by the shaft 14 of the roller 1. The roller 2 is carried by the shaft 15. The rollers 1 and 2 are joined by the cross-coupling 16, well known in the art, which enables the rollers 1 and 2 to rotate at the same speeds. It is also necessary to mention that the frusto conical rollers 1 and 2 and the arm 6 carrying the driving mechanism must be pivotally mounted to allow the frusto conical rollers 1 and 2 to adjust themselves in height according to the actual size of the fish and the gradually increasing and decreasing height of the individual fish. In the example illustrated, the fish 5 is transported head foremost but it is also possible to feed the fish tail foremost. The fish is guided by supporting elements of the type shown in applicant's earlier Patent No. 2,862,606.

FIG. 2 shows that the cross-section of the fish illustrated is unsymmetrical. It can also be seen that the straightening forces exerted by the frusto conical roller 1 press the back of the fish towards the right, thereby exerting a twisting effect on the whole body of the fish because the straightening forces exerted by the frusto conical roller 2 act as a counter-bearing and press the right hand side portion of the fish towards the left. The cross-section of the fish is consequently straightened out again and returned into its original symmetrical shape. Owing to the fact that the frusto conical surfaces gradually become closer together, this reshaping takes place gradually so that the fish cannot become damaged in the process.

I claim:

Apparatus for conveying and guiding fish to the processing tools of fish dressing machines, comprising a feeding device having guiding means for the belly of the fish, two conical rollers above said feeding device, means supporting the axes of said rollers at such angle to each other that the conical surfaces of said rollers become closer together in the direction in which the fish is fed, and means pivotally supporting said supporting means.

References Cited in the file of this patent
UNITED STATES PATENTS

| | | |
|---|---|---|
| 710,912 | Farmer | Oct. 7, 1902 |
| 1,138,300 | Letin et al. | May 4, 1915 |
| 1,934,087 | Payzant | Nov. 7, 1933 |
| 2,663,898 | Greiner | Dec. 29, 1953 |
| 2,702,921 | Pinney | Mar. 1, 1955 |
| 2,784,832 | Thomson | Mar. 12, 1957 |
| 2,832,988 | Schlichting | May 6, 1958 |
| 2,862,606 | Schlichting | Dec. 2, 1958 |
| 2,871,507 | Bartels et al. | Feb. 3, 1959 |
| 2,887,715 | Schlichting | May 26, 1959 |
| 2,895,163 | Danielsson | July 21, 1959 |